United States Patent
Koehler et al.

(10) Patent No.: US 10,654,386 B2
(45) Date of Patent: May 19, 2020

(54) TETHERING ASSEMBLY FOR ATTACHING TRIM TO A VEHICLE COMPONENT

(71) Applicant: Lear Corporation, Southfield, MI (US)

(72) Inventors: Stefan Koehler, Boeblingen (DE); Axel Haby, Wolfsburg (DE)

(73) Assignee: LEAR CORPORATION, Southfield, MI (US)

(*) Notice: Subject to any disclaimer, the term of this patent is extended or adjusted under 35 U.S.C. 154(b) by 51 days.

(21) Appl. No.: 15/980,361

(22) Filed: May 15, 2018

(65) Prior Publication Data

US 2019/0031067 A1    Jan. 31, 2019

(30) Foreign Application Priority Data

Jul. 25, 2017    (DE) .................. 10 2017 212 698

(51) Int. Cl.
| | |
|---|---|
| *B60N 2/72* | (2006.01) |
| *F16B 2/22* | (2006.01) |
| *B60N 2/58* | (2006.01) |
| *A47C 31/02* | (2006.01) |

(52) U.S. Cl.
CPC ............. *B60N 2/72* (2013.01); *B60N 2/5825* (2013.01); *F16B 2/22* (2013.01)

(58) Field of Classification Search
CPC .......... F16B 2/22; B60N 2/72; B60N 2/5825; B60N 2/5858; A47C 31/02; Y10T 24/45105
See application file for complete search history.

(56) References Cited

U.S. PATENT DOCUMENTS

| | | | |
|---|---|---|---|
| 5,480,201 A | 1/1996 | Mercer | |
| 5,848,818 A | 12/1998 | Flueckinger | |
| 6,299,255 B1* | 10/2001 | Pichon | B60N 2/5825 |
| | | | 297/218.5 |
| 7,568,761 B2* | 8/2009 | Mashimo | B60N 2/5825 |
| | | | 297/218.1 |
| 8,240,759 B2 | 8/2012 | Hobl et al. | |
| 9,027,994 B2* | 5/2015 | Hage-Hassan | B60N 2/5825 |
| | | | 297/218.1 |
| 10,065,577 B2* | 9/2018 | Braggion | B60R 13/0206 |
| 2008/0235914 A1 | 10/2008 | Dolberg | |
| 2013/0117973 A1* | 5/2013 | Murasaki | A47C 31/023 |
| | | | 24/581.11 |

* cited by examiner

*Primary Examiner* — Robert Sandy
(74) *Attorney, Agent, or Firm* — Brooks Kushman P.C.

(57) ABSTRACT

A tethering assembly includes an elastomeric strap, a fleece material and a rigid structural component with a hooked end. The tethering assembly holds a trim fabric in place in relation to a vehicle component. Advantageously, the assembly minimizes free play and rattling and helps sliding and detachment in case of partial contact between the tethering assembly and the vehicle component.

12 Claims, 3 Drawing Sheets

TETHERING ASSEMBLY FOR ATTACHING TRIM TO A VEHICLE COMPONENT

CROSS-REFERENCE TO RELATED APPLICATIONS

This application claims foreign priority benefits under 35 U.S.C. § 119(a)-(d) to DE 10 2017 212 698.1, filed Jul. 25, 2017, the disclosure of which is hereby incorporated by reference in its entirety.

BACKGROUND (1) Field of the Invention

Various embodiments relate to components such as elastomeric straps for securing trim such as a seat cover to a vehicle component such as a seat frame.

(2) Description of Related Art

A vehicle seat usually has a trim cover that provides a visible seating surface. Often, it may be desirable that the trim cover remain under tension to inhibit creasing, wrinkling and/or bulging that may degrade aesthetic appearance and/or reduce seating comfort.

Numerous fastening mechanisms are used to attach trim to structural components such as a seat frame in an automotive vehicle interior. One such fastening mechanism includes a hooked shape strip of plastic that is directly attached to a fabric trim. This sort of fastener is typically referred to as a "retainer". Such fasteners include hooks, staples, snap fasteners and the like. They are used for example to attach a fabric trim to a structural part of interior vehicle components such as driver and passenger seats plus rear seats. Although these types of fasteners work reasonably well, they sometimes exhibit free-plays and generate rattling noises due at least in part to dimensional tolerances of interfacing structural components.

In many conventional applications, holes in the trim cover are necessary, but such holes may weaken the resulting assembly. Further, such fasteners occupy scarce space in the seat.

Accordingly, there is a need for improved fastening components for attaching vehicle interior trim to structural components.

U.S. Pat. No. 8,240,759 (Lear) discloses using a stretchable elastomeric sling to provide tension to a trim cover to reduce creasing or displacement of a trim cover.

SUMMARY

In at least one embodiment, the present invention solves one or more problems of the prior art by providing an elastomeric strap, a fleece material and a shaped retainer for tethering vehicle trim to a structural component. Together, these three members are termed an "assembly".

The shaped retainer includes a rigid hook-shaped load-transmitting structural component. The claw end defines a curved section with a barb for receiving the vehicle structural component, such as a seat frame. Thus, there is a force is communicated between the elastomeric or rubber member and the retainer via the fleece material. The assembly holds for example a trim fabric in place over a seat frame. Advantageously, the rubber stretch strap minimizes free play and rattling, and tends to avoid sliding if there is partial contact between the assembly and a vehicle or seat component.

The stretchable elastomeric (e.g., rubber) strap generates a restoring force when stretched from a relaxed condition to a tensioned condition. Coextending with at least a portion of the rubber strap is a pliable material such as a fleece material that is secured to a shank portion of the retainer.

Securement of the rubber strap to the fleece is provided by a plurality of securing members. Such securing members are distributed at two or more longitudinally spaced locations along the fleece material between the ends of the fleece material. The rubber strap is extendable under tension and below its elastic limit develops a greater resistance to extension upon stretching.

As mentioned above, trim covers are usually affixed to the seat structure with retainers. This disclosure contemplates an additional function in the seat in which adjustable side bolsters are provided to give a seat occupant individual comfort and support. This function is especially desirable when the vehicle is being driven at high speed around curves and centrifugal forces are to be overcome. To address this need, movable side bolsters are added to the seat. In such applications, the trim cover should accommodate movement and thus be flexible.

But installation of flexible trim aided by the disclosed system requires no change in current trim covers currently used or additional versions of such trim covers. This is because in many cases an eye in the rubberized elastic straps of the assembly disclosed herein are preferably attached to a hook associated with the seat structure, or vice-versa.

DETAILED DESCRIPTION

Figure 1:
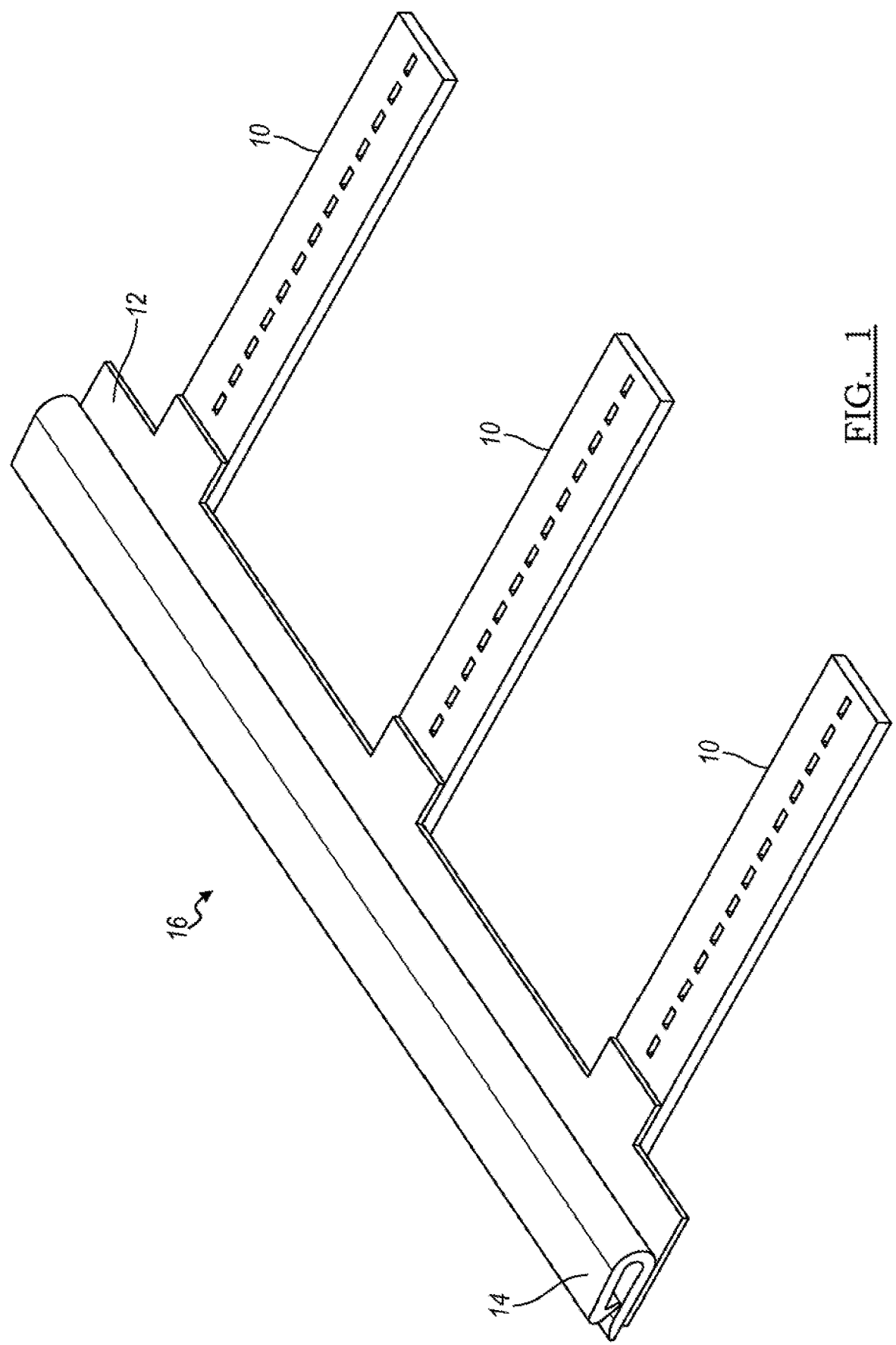
FIG. 1 is an isometric view of rubber straps extending from a fleece material that is connected to an elongate hook-shaped retainer that together form a tethering assembly.
Figure 2:
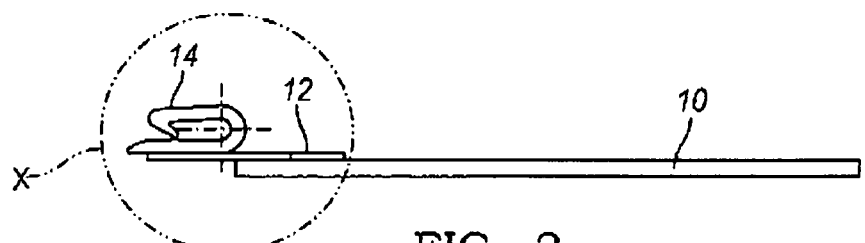
FIG. 2 is a side view of the assembly shown in FIG. 1.
Figure 3:
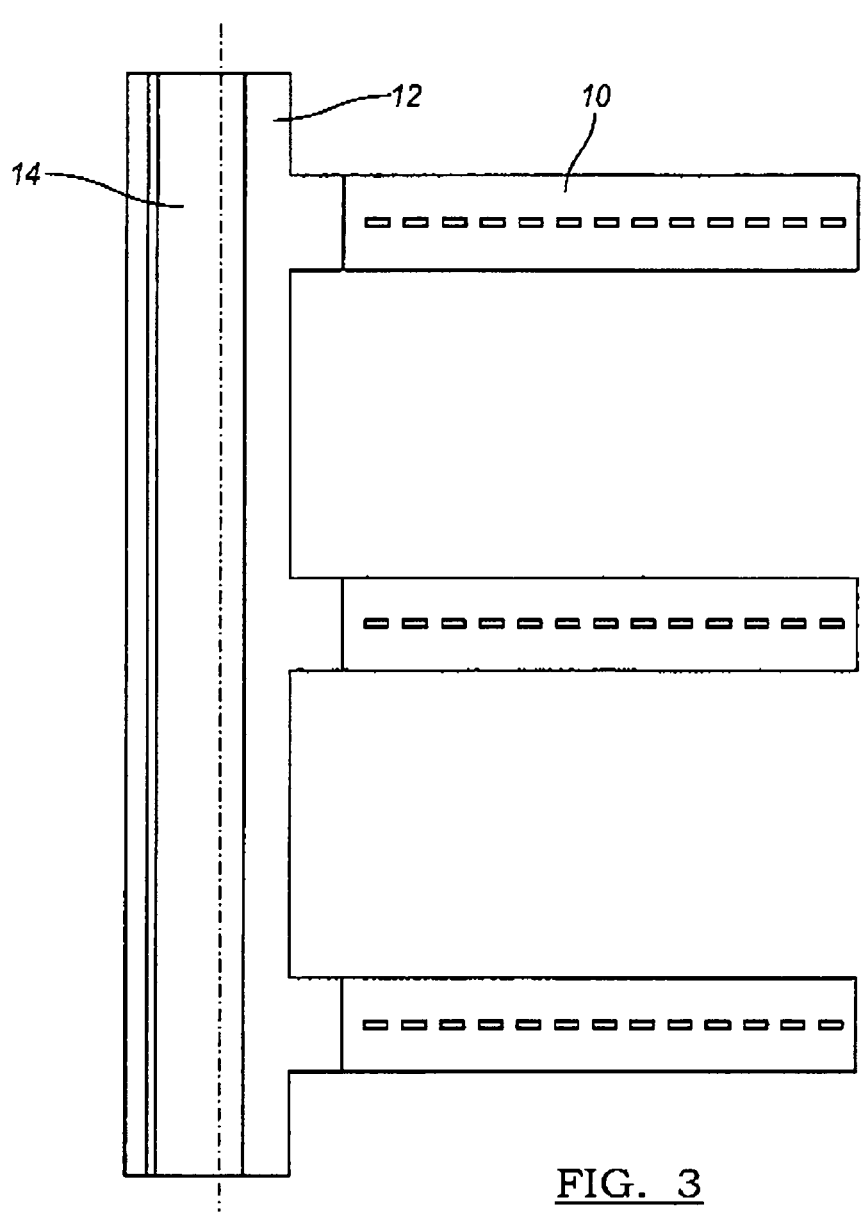
FIG. 3 is a top plan view of the assembly shown in FIG. 1.
Figure 4:
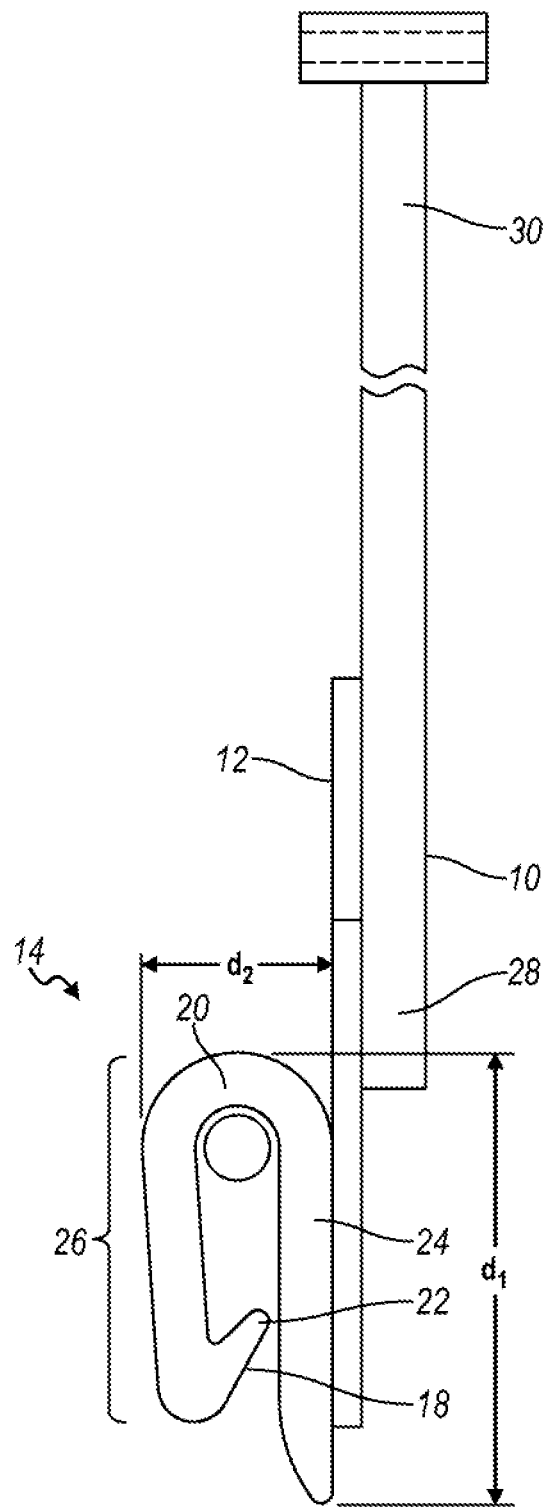
FIG. 4 is an enlarged side view of the portion of FIG. 2 that is designated by the letter "X".

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In at least one embodiment illustrated in FIGS. 1-4, the present tethering assembly 16 includes one or more elastomeric or rubber straps 10, a fleece material 12 and a hook-shaped retainer 14 for attaching vehicle trim to a structural component. Together, these three members are termed an "assembly" 16.

The shaped retainer 14 (FIG. 4) in one embodiment is a rigid hook-shaped load-transmitting structural component. Its claw end 18 extends from a bite section 26 that in turn extends from a bend section 20. A barb 22 receives and engages a vehicle structural component, such as a seat frame. Communicating with the bend section 20 is a shank section 24. Thus, tensile forces are communicated between the rubber member 10 and the retainer 14 via the fleece material 12. The assembly 16 holds for example a trim fabric in place over a seat frame. Advantageously, the rubber stretch strap 10 minimizes free play and rattling, and tends to avoid sliding if there is partial contact between the assembly 16 and a vehicle or seat component.

At least one rubber stretchable strap 10 is an elongated, elastomeric (e.g., rubber) member having the properties of generating a restoring force when stretched from a relaxed condition to a tensioned condition. In FIG. 1, three such straps 10 are shown extending from an elongate fleece member 12, although the invention is not so limited. Coextending with at least a proximal portion 28 of the rubber member 10, the fleece material 12 is secured to a shank portion 24 of the retainer 14.

Securement of the rubber strap 10 to the fleece material 12 is provided by conventional means for adhering, including glues, cements, sewing, rivets, bolts, fasteners, screws and the like. Such adhering means are distributed at longitudinally spaced locations (FIG. 1) along the fleece material 12 between its ends. If desired the straps 10 can be detachably attached to the fleece material 12 by such means as a hook and eye to allow the length of a strap 10 to be adjusted. At least some of the rubber straps 10 are extendable by stretching and develop a greater resistance to extension upon stretching.

As used herein the term "fleece" connotes spun fibers, including all processed, plant or animal materials. The term can include synthetics such as nylon and Tencel®. It is understood that "fleece" may include any kind of animal fiber and can cover a range of unprocessed or prepared fibers.

FIGS. 1-4 offer various schematic views of the assembly. The retainers 14 are typically used to attach interior trim to a vehicle component such as a passenger seat or head restraint. One retainer 14 includes a rigid structural component having shank side 24 connected via the bend section 20 (FIG. 4) to a claw portion 18 that terminates in a barb 22. A bite portion 26 connects the claw portion 18 to the bend section 20. The claw 18 and barb 22 receive and hold (i.e., hook onto) a vehicle structural component. The shank section 24 may be substantially straight or curved.

A distance $d_1$ (FIG. 4) gives one example of the extent of the retainer 14 on its shank side 24. Distance d1 is typically from about 1 to 8 cm. The distance $d_2$ illustrates one width dimension across the bend section 20. Distance $d_2$ is typically from about 0.5 to about 2 cm. In the example shown, a proximal end region 28 of the rubber strap 10 is applied to the shank side 24. At a distal end region 30 of the strap 10, a trim component is secured.

In practice, the retainer 14 is typically formed from a metal or a plastic, and in particular, a rigid plastic. In one case, a suitable material from which the retainer 14 is formed has a flexural modulus greater than 0.5 GPa (Gigapascal). As used herein the flexural modulus and Young's modulus refer to though properties at 25° C. In one refinement, suitable rigid materials have a flexural modulus from 0.5 GPa to 5 GPa. The flexural modulus as used herein may be determined by any suitable test including for example ASTM D 790. Alternatively, the rigid retainer 14 is characterized by a Young's Modulus that is greater than 0.5 GPa. Typically, the Young's Modulus of the retainer 14 is from 0.5 to 500 GPa; 1 to 400 GPa; 2 to 200 GPa; or 3 to 100 GPa in increasing order of preference.

Suitable rigid plastics include, but are not limited to, polyolefins and other thermoplastic polymers. Specific examples include, but are not limited to, acrylonitrile butadiene styrene (ABS), polypropylene, polyethylene, acetal copolymer, acrylic, nylon, polycarbonate, polyamide, polystyrene, and the like.

In one example, the retainer 14 holds a trim fabric in place over vehicle component frame, which can be metal, plastic or another stiff material. Advantageously, the rubber straps 10 minimize free play and rattling as well as assisting in avoiding sliding and detachment in case of partial contact between the retainer 14 and a vehicle component frame to which it is tethered. Rubber straps 10 are typically characterized by a Young's Modulus that is less than 0.5 GPa. In one refinement, a rubber strap 10 has a Young's Modulus that is less than 0.1 GPa. Typically, the rubber strap 10 has a Young's Modulus from about 0.01 GPa to about 0.1 GPa.

In some cases, the rubber straps 10 are formed from an elastomer. Examples of suitable elastomers include, but are not limited to, natural polyisoprene rubbers, synthetic chloroprene rubber, polyisoprene rubber, butadiene rubber, butyl rubbers, halogenated butyl rubbers, styrene-butadiene rubber, nitrile rubbers, ethylene propylene rubber (EPM), ethylene propylene diene rubber (EPDM), polyacrylic rubber, silicone rubbers, fluoroelastomers, ethylene-vinyl acetate, and the like.

The assembly 16 can be used to attach interior trim to a vehicle component such as a passenger seat or head restraint. In another refinement, the retainer 14 may be secured to or integrated with a metal frame. Attachment of the assembly 16 to a metal frame may be accomplished by welding if retainer 14 is metal or by an adhesive bonding if the retainer 14 is a rigid plastic.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tethering assembly for attaching a trim component to a vehicle component, the tethering assembly comprising:
   an elastomeric strap having a distal end region to which the trim component is attached,
   a fleece material secured to a proximal end region of the elastomeric strap, and a shaped retainer attached to the fleece material, the shaped retainer defining a hook-shaped load-transmitting member for receiving the vehicle component, thereby enabling tensile forces to be communicated between the elastomeric strap and the shaped retainer through the fleece material.

2. The tethering assembly of claim 1 wherein the shaped retainer has a bend section for receiving the vehicle component and a shank section that receives the fleece material.

3. The tethering assembly of claim 1 wherein the shaped retainer has a flexural modulus greater than 0.5 GPa.

4. The tethering assembly of claim 1 wherein the shaped retainer has a flexural modulus from 0.5 GPa to 5 GPa.

5. The tethering assembly of claim 1 wherein the shaped retainer comprises a material selected from the group consisting of thermoplastic polymers.

6. The tethering assembly of claim 1 wherein the shaped retainer comprises a material selected from the group consisting of acrylonitrile butadiene styrene (ABS), polypropylene, polyethylene, acetal copolymer, acrylic, nylon, polycarbonate, polyamide, polystyrene, and combinations thereof.

7. The tethering assembly of claim 1 wherein the elastomeric strap has a Young's Modulus that is less than 0.5 GPa.

8. The tethering assembly of claim 1 wherein the elastomeric strap has a Young's Modulus from about 0.1 GPa to about 0.1 GPa.

9. The tethering assembly of claim 1 wherein there are multiple elastomeric straps that extend from the fleece material.

10. The tethering assembly of claim 1 wherein the elastomeric strap comprises a component selected from the group consisting of natural polyisoprene rubbers, synthetic chloroprene rubber, polyisoprene rubber, butadiene rubber, butyl rubbers, halogenated butyl rubbers, styrene-butadiene rubber, nitrile rubbers, ethylene propylene rubber (FPM), ethylene propylene diene rubber (EPDM), polyacrylic rubber, silicone rubbers, fluoroclastomers, ethylene-vinyl acetate, and combinations thereof.

11. The tethering assembly of claim 1 wherein a proximal end region of the elastomeric strap is disposed on a shank section of the retainer.

12. The tethering assembly of claim 1 wherein the retainer includes a barbed portion that engages the vehicle component for holding the tethering assembly in place.

* * * * *